United States Patent [19]

Hrncir et al.

[11] Patent Number: 4,635,480
[45] Date of Patent: Jan. 13, 1987

[54] DENSITY COMPENSATING FLOAT

[75] Inventors: Robert E. Hrncir, Dallas; Herbert G. Ross, Jr., Carrollton, both of Tex.

[73] Assignee: Rochester Gauges, Inc., Dallas, Tex.

[21] Appl. No.: 661,039

[22] Filed: Oct. 15, 1984

[51] Int. Cl.⁴ .................... G01F 23/76; G01F 23/38
[52] U.S. Cl. .................... 73/322.5; 73/317; 73/448; 222/67; 137/416
[58] Field of Search ............ 73/305, 309, 317, 322.5, 73/447, 448, 454; 340/623, 625; 222/67; 137/423, 416, 425, 446, 458; D22/30; 116/229

[56] References Cited

U.S. PATENT DOCUMENTS

| | | | |
|---|---|---|---|
| 2,098,085 | 11/1937 | D'Arcey | 340/625 |
| 2,201,974 | 5/1940 | Andersson | 137/425 |
| 2,669,123 | 2/1954 | Ballard | 73/317 |
| 2,678,060 | 5/1954 | Arne | 73/322.5 |
| 2,761,467 | 9/1956 | Arne | 73/305 |
| 4,064,907 | 12/1977 | Billington et al. | 137/446 |
| 4,142,419 | 3/1979 | Fenne et al. | 73/447 |
| 4,313,459 | 2/1982 | Mylander | 137/416 |
| 4,483,367 | 11/1984 | Ross, Jr. et al. | 73/317 |

FOREIGN PATENT DOCUMENTS 0724338  2/1955  United Kingdom .............. 73/322.5

Primary Examiner—Charles Frankfort
Assistant Examiner—Thomas B. Will
Attorney, Agent, or Firm—Richards, Harris, Medlock & Andrews

[57] ABSTRACT

A density compensating float is used in conjunction with a stop-fill valve for limiting the filling of a tank. The primary application of the density compensating float is for use in LPG tanks. The compensating float includes a portion thereof having graded volumetric segments which correspond to the changes in density for a particular fluid, such as propane. For a given quantity of fluid in the tank, the float has an essentially constant angular position despite variations in the density of the fluid, and therefore changes in buoyancy of the fluid, as a result of changes in temperature. Thus, fluid at any temperature can be input into the tank and the stop-fill valve will be activated when a given quantity of fluid has been received without regard to the temperature of the fluid. This provides maximum filling of the tank while limiting the fluid to the maximum safe quantity.

6 Claims, 5 Drawing Figures

DENSITY COMPENSATING FLOAT

TECHNICAL FIELD

The present invention pertains to the field of liquid measurement and in particular to the measurement of bottled liquefied petroleum gas.

BACKGROUND OF THE INVENTION

Liquefied petroleum gas (LPG) such as propane is frequently stored for use in relatively small tanks. This is particularly true for consumer applications. LPG products have a substantial coefficient of expansion, and with a change in temperature, the volume of liquefied gas can contract or expand substantially. Since liquids are noncompressible, any expansion of the fluid in the tank can possibly cause a hazardous overpressurized condition. To prevent the occurrence of such a condition, tanks must be filled only to a specified maximum liquid level at ambient conditions to leave sufficient vapor space to accommodate the greatest possible expansion of the the liquid. Automatic stop-fill valves have been developed to control the amount of liquid stored in the LPG tank. Such a valve is shown in U.S. Pat. No. 4,313,459. However, such stop-fill valves can shut off the flow of fluid when different quantities have been received into the tank depending on the temperature of the fluid. To ensure safe operation, such valves must be set to shut off at a relatively low volume level, and as a result the tank is not necessarily filled to the optimum level.

It is desirable to fill an LPG tank with the maximum amount of fluid for convenience of use while maintaining a safe pressure level in the tank. In view of these requirements there exists a need for a float mechanism for use with a stop-fill valve for gauging the quantity of the LPG in the tank independent of the density, and therefore temperature, of the fluid.

SUMMARY OF THE INVENTION

A selected embodiment of the present invention comprises a density compensating float for indicating the quantity of fluid in a container substantially independent of the density of the fluid. The float comprises a float member which includes at least a portion thereof having predetermined volumetric grading along a dimension thereof where the volumetric grading is related to the density variation of the fluid. The volumetric grading provides floatation for maintaining the float member in a substantially constant floatation position relative to the container independent of changes in the density for a given quantity of the fluid. Further mechanical means are provided for supporting the float member to the container.

BRIEF DESCRIPTION OF THE DRAWINGS

For a more complete understanding of the present invention reference is now made to the following Detailed Description taken in conjunction with the following drawings in which.

DETAILED DESCRIPTION OF THE INVENTION

Figure 1:
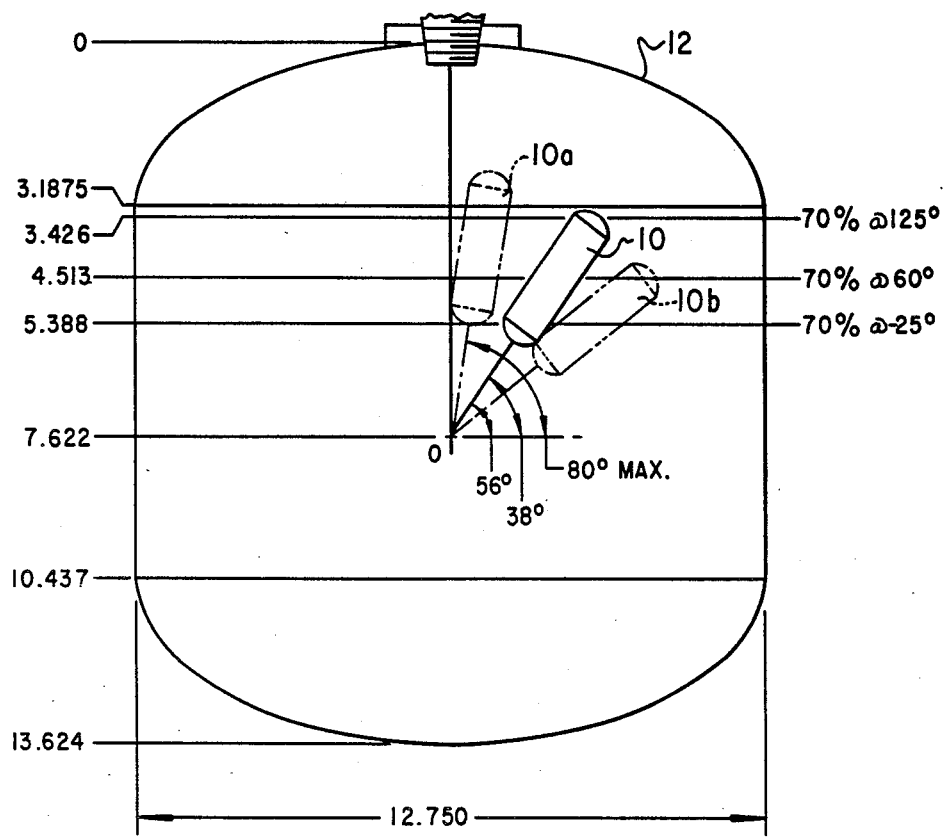
FIG. 1 is an illustration of a prior art float in an LPG tank showing the changes in the float angle as a function of the density and corresponding temperature for the LPG.
Figure 5:
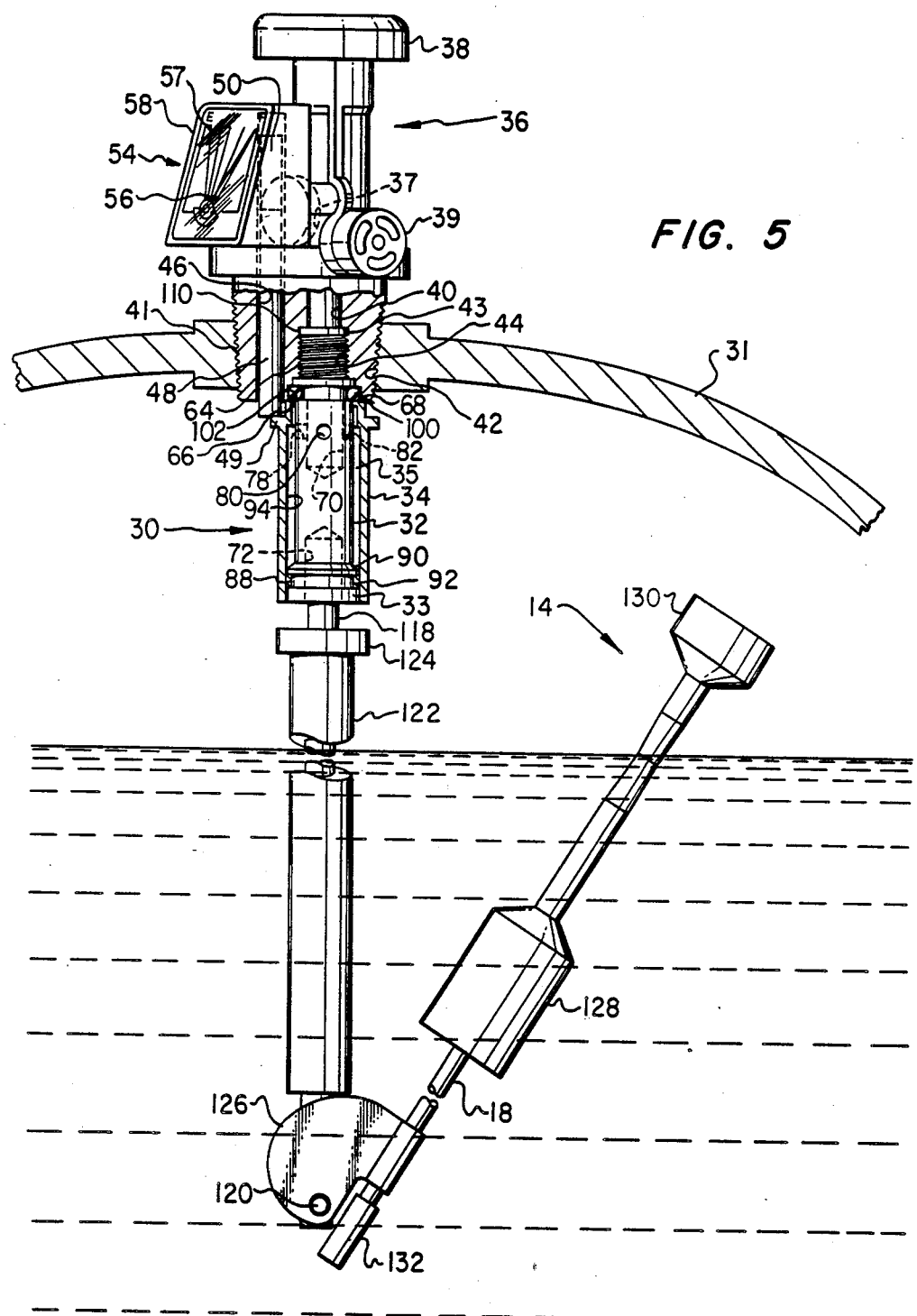
FIG. 5 is an illustration of the density compensating float of the present invention used in conjunction with a stop-fill valve for providing shut-off for filling a tank when the tank has received a constant quantity of fluid regardless of the density of the fluid.

Referring now to FIG. 1 there is schematically illustrated a float for use in conjunction with a stop-fill valve. A representative stop-fill valve is illustrated in FIG. 5. Such a stop-fill valve provides a shut-off of fluid flow when the float reaches a predetermined activation angle. Floats are typically designed to be extremely bouyant, such that they remain very close to the surface of the fluid even in its least dense state. Since the stop-fill valve is activated at a predetermined float angle, it can be seen that the amount of fluid actually received in the tank is dependent upon the fluid density, and therefore, temperature. If the fluid is extremely cold, the float will cause the stop-fill valve to be activated after a greater quantity of fluid is received into the tank. If the fluid is relatively warm, the float will cause the stop-fill valve to be activated when a lesser quantity of fluid has been received into the tank.

Referring to FIG. 1 there is illustrated a float which activates a stop-fill valve at an angle of 56° from the horizontal. The illustrated float is counterbalanced to be one-half submerged in the fluid. It is desired to have a fluid volume of 70% of the tank volume at 60° F.

In FIG. 1 there is illustrated a conventional float 10. The float 10 is used within a tank 12. At 60° F. the float 10 is at an angle of 56° for fluid at a temperature at 60° F. with 70% volume at standard conditions. This is the desired fluid volume within the tank at standard temperature. However, when the fluid in the tank has expanded from the 60° temperature up to 125° F., the float is raised to be in the position indicated by a float 10a which is shown by phantom lines. This is at an angle of 80° from the horizontal. When the fluid has entered the tank 12 at 60° and filled to 70% but then lowered to a temperature of −25°, the float 10 is lowered to the position as indicated by phantom line float 10b which is at an angle of 38° from the horizontal. Thus, the conventional float 10 changes position as a function of the density of the fluid even though there is a constant quantity of fluid (70% of tank volume) in each instance. The illustrated tank dimensions are in inches.

Figure 2:
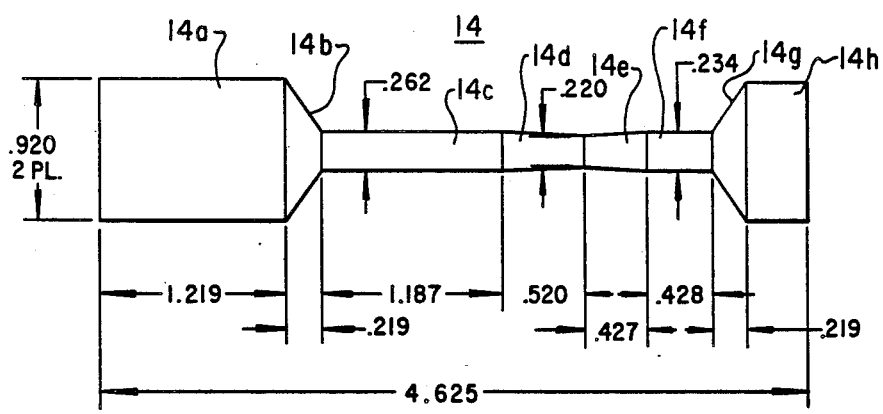
FIG. 2 is an illustration of a float member in accordance with the present invention showing the volumetric grading along the central axis.

Referring now to FIG. 2 there is illustrated a float member 14 in accordance with the present invention. The float member 14 is preferably fabricated as a foam molded entity comprising, for example, DELRIN acetal resin plastic material. The float member 14 is made up of various segments 14a through 14h. The dimensions for each of the segments is shown in FIG. 2. The dimensions are in inches. A portion of the float member 14 comprising segments 14c, 14d, 14e, and 14f consists of predetermined volumetric graded sections. These volumetric graded sections are proportioned relative to the density of propane for the illustrated embodiment. The float member 14 further includes float elements at each end of the graduated portion. These float elements comprise segments 14a, 14b and 14g, 14h.

Figure 3:
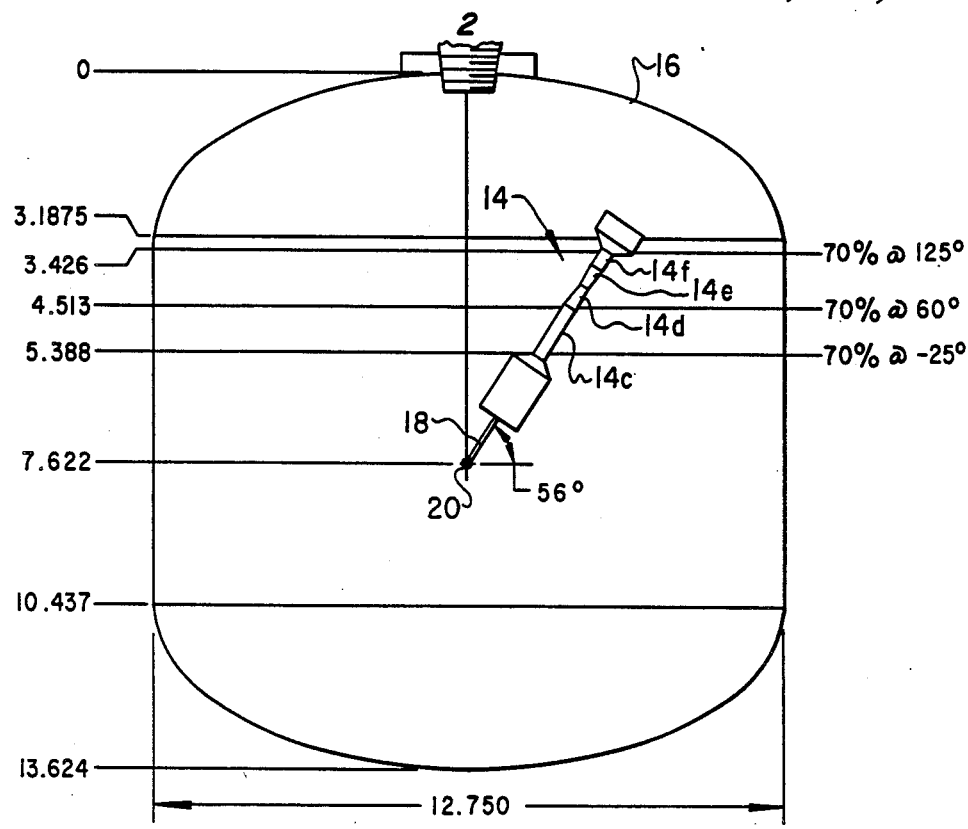
FIG. 3 is an illustration of the float member shown in FIG. 2 installed within a tank and further illustrating the constant position of the float member as a function of changes in the density and temperature of the LPG in the tank.

Referring now to FIG. 3 there is illustrated the application of the float 14 within an LPG tank 16. The float member 14 is connected along a supporting rod 18 to a pivot point 20. For the present example the rod 18 is 1 and ⅛ inches long. As a result of the volumetric graduations of the segments 14c, 14d, 14e and 14f, the float member 14 remains at an angle of 56° when the tank 16 is filled with a given quantity of propane which at 60° F. comprises 70% of tank volume. However, the actual temperature, and therefore density, of the propane can be anywhere in the range of −25° to 125°. Despite these changes in density the float member 14 is maintained at an angle of approximately 56°. Therefore, when the tank 16 is being filled, the float member 14, will rise to a 56° cutoff angle when the desired quantity of propane is received into the tank 16 independent of the density, and therefore temperature, of the fluid being received. By use of the float member 14 the tank 16 is filled with the desired quantity of LPG without regard to the actual temperature of the fluid as it is supplied into the tank 16.

Figure 4:
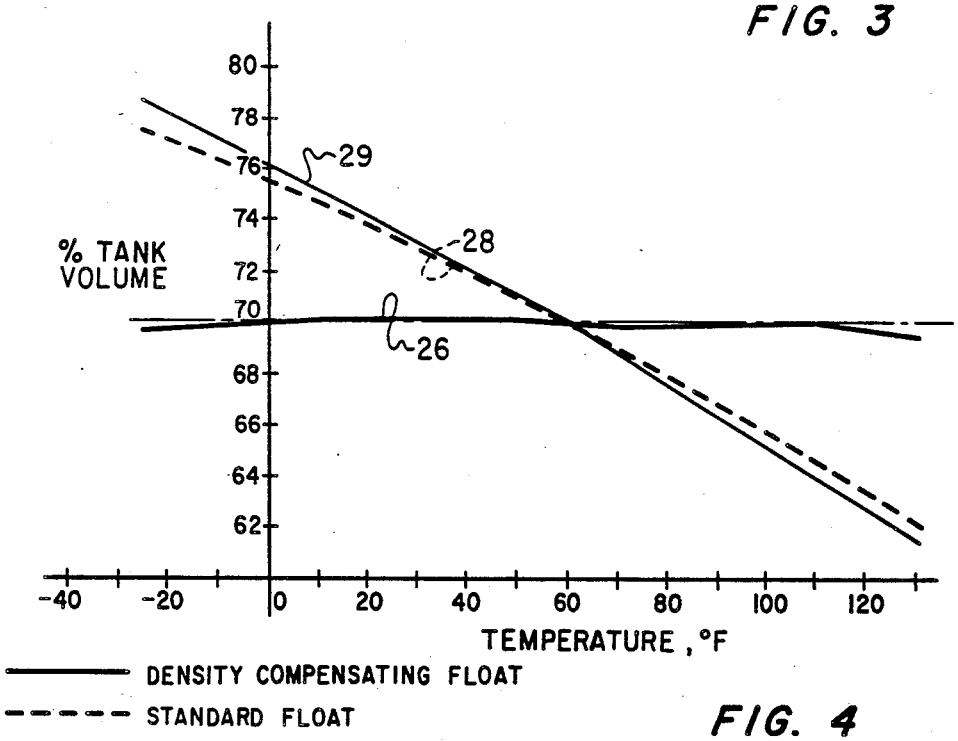
FIG. 4 is a chart illustrating the shut-off volume of an LPG tank in percent for a standard float as compared to the density compensating float in accordance with the present invention.

Referring now to FIG. 4 there is illustrated a graph comparing the shut-off tank volume for the tank 16 with both the float member 14 and a standard float 10 as shown in FIG. 1. Both are used with a stop-fill valve having a 56° shut-off angle. The vertical scale indicates the percent of tank volume and the horizontal scale indicates the temperature in degrees Fahrenheit for the fluid as it is entered into the tank 16. Line 26 represents the tank volume for the density compensating float member 14 in accordance with the present invention. Line 28 represents a conventional float, which has very little density compensation. Line 29 depicts a hypothetical float with no density compensation. Note that as the temperature of the fluid is increased for the conventional float, the actual tank volume at standard conditions is decreased.

For FIG. 4 it is assumed that the stop-fill valve has a 56° activation angle. If the fluid is entered into the tank at 125° F., instead of 60° F., the stop-fill valve with the standard float 10 will be activated at the 56° angle when the liquid level is at 71.08% of tank volume. At standard density at 60° F. this corresponds to only 62.6% of tank volume. But if the fluid is entered into the tank at minus 25° F., the float angle of 56° is reached when the liquid level in the tank is 69.09%. This volume, at standard density at 60° F., corresponds to 77.5% of tank volume. It can best be seen that when filling a tank with fluid within the temperature range of minus 25° F. to plus 125° F. the corrected standard volume of the tank at the standard temperature of 60° F. ranges from 62.6% to 77.5%. This is substantial variation from the required 70% level at standard conditions.

As can be seen in FIG. 4, the float member 14 operates to fill the tank 16 essentially independent of the density and, therefore, temperature of the fluid. The slight variations away from the 70% tank volume line are due to the incremental segments 14c, 14d, 14e and 14f. The float member 14 can be fabricated to have a continuous curve to almost exactly compensate for the fluid density variations. However, the extremely close correspondence of line 26 to the 70% tank volume line is well within acceptable limits for practical applications.

Referring now to FIG. 5 there is illustrated the float member 14 used in conjunction with a stop-fill valve 30. The valve 30 and the float member 14 are included within a tank 31. The valve 30 includes a main support 32 which is basically a cylindrical body. At the lower end of the support 32 there is provided a support shoulder 33 which is in the form of a circular flange having a greater diameter than the main cylindrical body of the support 32. A power cylinder 34 is slideably mounted on the exterior of support 32 over the shoulder 33 to form an annular space 35 between the main support 32 and the power cylinder 34. The fuel which is stored in the tank 31 is introduced into the tank and removed from it through a service valve 36. A service valve opening 37 is threaded to provide a connection to receive liquefied fuel and deliver vapor to a user device. The flow of fluid and vapor through the valve 36 is controlled by operation of a service valve handle 38. A release valve 39 is connected to the service valve 36 to release fluid from the tank 31 in the event that tank 31 becomes overpressurized.

On the interior of the valve 36 there is a filling and withdrawing passage 40 which provides fuel and vapor communication with the tank 31 through the valve 36.

The valve 36 is provided with valve external threads 41 which are engaged to a threaded opening 42 in the tank 31.

At the lower end of the passage 40, the valve 36 is provided with a filling passage shoulder 43. Immediately below the shoulder 43 the valve 36 has a threaded opening 44.

The valve 36 further includes a vertical enlongate opening 46 which receives a magnet lift tube 48 which is supported by a shoulder 49 of the power cylinder 34. The lift tube 48 supports a magnet 50 which is also located in the opening 46. Within a gauge 54, a pointer 56 is provided with a magnet segment that interacts with the magnet 50. The pointer 56 is mounted within a dial chamber 58 wherein the pointer 56 indicates the amount of fluid stored in the tank 31 as indicated by a gauge scale 57. The pointer 56 also indicates the operational status of the stop-fill valve 30 and visibly alerts the filling operator when the predetermined fluid level in the tank has been reached.

Further referring to FIG. 5, the main support 32 has external threads 64 at the upper end of the support and these threads engage the threaded opening 44. Just below the threads 64, the main support 32 is provided with an O-ring groove 66 which receives an O-ring 68. The main support 32 has an upper axial bore 70 which extends from the threaded end of the support 32 and is terminated at approximately the middle of the support. The support 32 further includes a lower axial bore 72 which opens at the lower end of the support 32 and is terminated at approximately ⅓ of the length of the bore. The bores 70 and 72 are not open to each other.

The main support 32 has four filling and pressure release ports equally spaced around the main support. Three of those ports are labeled as 78, 80 and 82. The ports extend through the wall of the support 32 to open into the bore 70. The ports, including port 78, are arranged symmetrically about the axis of the support 32. The preferred arrangement of ports is a symmetrical arrangement around the main support 32.

At the lower end of the main support 32, adjacent to the shoulder 33, there is formed a groove 88 between the support shoulder 33 and a shoulder 90. Within the groove 88 there is mounted a lip seal ring 92. When the lip seal ring 92 is pressurized from the interior of the annular space 35, the seal ring 92 is forced outward and forms a pressure seal between the groove 88 of main support 32 and interior surface 94 of the power cylinder 34.

Further referring to FIG. 5, the power cylinder 34 has a seal neck 100 which fits closely about the exterior cylindrical surface of the main support 32. The very upper end of the power cylinder 34 comprises a cylindrical shoulder seat 102 which is adapted to engage the O-ring 68 and form a pressure seal between the main support 32 and the power cylinder 34.

At the upper end of the threads 64 there is provided a shoulder 110 which engages the filling passage shoulder 43.

A support shaft 118 is fitted within the bore 72 for connection to the main support 32. At the lower end of the support shaft 118 there is provided an adjustable pivot 120. Pivot 120 can be adjusted to be located at different points along the length of the shaft 118 to calibrate the stop-fill valve 30. A lift sleeve 122 is slideably mounted on the support shaft 118. A lift washer 124 is slideably mounted on the shaft 118 above the sleeve 122. The diameter of the washer 124 is approximately the same as that of the power cylinder 34 such that the washer 124 can support the cylinder 34. The sleeve 122 and washer 124 are not connected and together comprise a lift member.

A cam 126 is mounted to the pivot 120 and is further connected to the float rod 18 described with respect to FIG. 3 which is in turn connected to the float member 14. Float member 14 includes float elements 128 and 130 corresponding to float elements 14a and 14h (FIG. 2). A counter balance 132 is connected to the end of the rod 18 opposite the float member 14.

Operation of the stop-fill valve 30 in conjunction with the float member 14 is now described in reference to FIG. 5. The stop-fill valve 30 is shown in the activated (closed) position. When fluid is received into the stop-fill valve 30, and the float member 14 is hanging downward from the pivot 120, fluid is exhausted from the passage 40 outward above the lower, resting position of the power cylinder 34. As the fluid level increases the float rises therefore lifting the sleeve 122 and washer 124 which in turn lifts the power cylinder 34. When the upper end of the power cylinder 34 starts to enclose the release ports, including 78, 80 and 82 the annular space 35 is pressurized thereby driving the power cylinder 34 upward in a snap-action. The power cylinder 34 is lifted above the washer 124. When the power cylinder 34 snaps into place, the incoming flow of fluid is terminated since there is no exhaust from the annular space 35. The angle which the float member 14 forms above the horizontal when the power cylinder 34 is activated, is termed the activation angle. This is, for example, 56°, as described above. By use of the float 14, and in accordance with the present invention, the stop-fill valve 30 will be activated at the same angular position, namely 56°, when the volume of fluid in the tank reaches a volume equivalent to 70% of tank volume at 60° F. no matter what the actual volume of fluid within the tank 31.

In summary, the present invention comprises a float member for measuring the quantity of fluid in a tank. The float member includes a portion thereof which has graduated volumetric segments which correspond to changes in the density of the fluid contained within the tank. For a given volume of fluid in the tank, the float member is maintained at essentially a constant angle relative to a pivot point. Thus, for gauging purposes, the tank can be filled to receive a given quantity of fluid independent of its density, and therefore, temperature of the fluid.

Although one embodiment of the invention has been illustrated in the accompanying drawings and described in the foregoing detailed description, it will be understood that the invention is not limited to the embodiment disclosed, but is capable of numerous rearrangements, modifications and substitutions of elements without departing from the scope of the invention.

We claim:

1. A density compensating float for indicating the quantity of fluid in a tank substantially independent of the density of the fluid, comprising:

a float member which includes at least a portion thereof having predetermined volumetric grading along a dimension thereof, said volumetric grading related to the density variation of said fluid for maintaining said float member in a substantially constant floatation position relative to said tank independent of changes in density for a given quantity of said fluid;

said portion of said float member comprising four discrete volumetric segments positioned along an axis of said float member, said segments including:

a first segment having first and second ends and having a first diameter between said first and second ends thereof;

a second segment having first and second ends said first end thereof being connected to said second end of said first segment and having a diameter equal to said first diameter, said second end thereof having a second diameter less than said first diameter;

a third segment having first and second ends, said first end thereof being connected to said second end of said second segment and having a diameter equal to said second diameter, said second end thereof having a third diameter greater than said second diameter and less than said first diameter; and a fourth segment having first and second ends, said first end thereof being connected to said second end of said third segment and having a diameter equal to said third diameter between said first and second ends thereof; and means for supporting said float member in said tank.

2. The density compensating float as recited in claim 1 wherein said means for supporting is rigidly connected to said float member and said means for supporting is connected to rotate about a pivot.

3. The density compensating float as recited in claim 1 including float elements connected respectively to said first end of said first segment and said second end of said fourth segment of said portion of said float member.

4. A density compensating float for use in conjunction with a stop-fill valve for controlling the qunatity of a fluid filled into a tank independent of the density of the fluid, comprising:

lifting means for activating said stop-fill valve, a cam mounted on a pivot, said cam for driving said lifting means, a rod connected to said cam, a float member connected to said rod for rotating about said pivot for lifting said lifting means as said tank is filled with fluid, said float member including a portion thereof having predetermined volumetric grading along a dimension thereof, said volumetric grading related to the density variation of said fluid for maintaining said float member in a substantially constant floatation position relative to said tank independent of changes in density for a given quantity of said fluid, said portion of said float member comprising four discrete volumetric segments positioned along an axis of said float member, said segments including:

a first segment having first and second ends and having a first diameter between said first and second ends thereof;

a second segment having first and second ends, said first end thereof being connected to said second end of said first segment and having a diameter equal to said first diameter, said second end thereof having a second diameter less than said first diameter;

a third segment having fisrt and second ends, said first end thereof being connected to said second end of said second segment and having a diameter equal to said second diameter, said second end thereof having a third diameter greater than said second diameter and less than said first diameter; and a fourth segment having first and second ends, said first end thereof being connected to said second end of said third segment and having a diameter equal to said third diameter between said first and second ends thereof.

5. The density compensating float as recited in claim 4 including float elements connected respectively to said first end of said first segment and said second end of said fourth segment of said portion of said float member.

6. The density compensating float as recited in claim 4 inlcuding a counterbalance connected to the opposite end of said rod from said float member.

* * * * *